United States Patent [19]
Reinhold et al.

[11] 3,918,316

[45] Nov. 11, 1975

[54] GEAR SHIFT ARRANGEMENT

[75] Inventors: Norbert Reinhold; Horst Berg, both of Wolfsburg, Germany

[73] Assignee: Volkswagenwerk Aktiengesellschaft, Wolfsburg, Germany

[22] Filed: Apr. 17, 1974

[21] Appl. No.: 461,488

[30] Foreign Application Priority Data
May 29, 1974 Germany............................ 2327283

[52] U.S. Cl..................... 74/473 P; 74/491; 74/523
[51] Int. Cl.²......................................... B60K 20/00
[58] Field of Search........ 74/473 P, 473 R, 491, 18, 74/18.2, 523

[56] References Cited
UNITED STATES PATENTS

| | | | |
|---|---|---|---|
| 1,487,380 | 3/1924 | Harris............................ | 74/473 P |
| 1,927,646 | 9/1933 | Miller............................ | 74/473 P |
| 2,136,697 | 11/1938 | Lapsley......................... | 74/473 P |
| 2,327,550 | 8/1943 | Peterson et al................. | 74/473 |
| 2,582,895 | 1/1952 | Young............................ | 74/473 |
| 3,482,465 | 12/1969 | Lusted........................... | 74/523 |

*Primary Examiner*—Samuel Scott
*Assistant Examiner*—Randall Heald
*Attorney, Agent, or Firm*—Ernest F. Marmorek

[57] ABSTRACT

A gear shift arrangement including a hand lever with an operating ball secured to it, the ball being journalled in a block, a sealing arrangement connecting the hand lever with the block, a collar formed on the hand lever, and a collar formed on the block, the sealing arrangement at one end thereof positively abutting on the collar of the hand lever and at the other end thereof positively abutting against the collar of the block, the sealing arrangement, when mounted, is under a compression, whereby the sealing arrangement presses the operating ball of the hand lever into a journaling position thereof within the block.

9 Claims, 5 Drawing Figures

GEAR SHIFT ARRANGEMENT

FIELD OF THE INVENTION

The present invention relates to a gear shift device especially to a gear shift device for motor vehicles, which includes an operating ball coupled to the shift lever and a gear shift lever bracket in which the operating ball is journalled and wherein the hand lever or stick shift is connected with the lever bracket by means of an elastic sealing means.

BACKGROUND OF THE INVENTION

In known shift gear devices the sealing is usually in the form of a thin walled elastic sleeve which is positively secured to the stick shift lever bracket and slidably connected with the hand lever or stick shift itself, whereby the entry of dirt is prevented into the stick shift journaling means and into the gear itself. A compression spring in the form of a coil spring is provided in the known gear shift devices for pressing the operating ball of the stick shift or hand lever into the journaling position within the gear shift lever bracket or block. In such gear shift arrangement, the reverse position can be shifted into only after the stick shift has been pressed down which operation actually affects the pressing of a check ring placed on the stick shift or hand lever below a stop plate, since otherwise the hand lever is secured in this position by means of the compression spring.

SUMMARY OF THE INVENTION

It is an object of the present invention to provide an improved gear shift device of the above mentioned type which while satisfying the same need as a gear shift, will have a substantially simplified structure enabling a relatively simple assembly of the associated parts of the vehicle.

According to the present invention, the sealing is arranged at one end thereof on a collar of the hand lever or stick shift while at the other end thereof, it is tightly mounted on the stick shift bracket of the housing block, and has such construction and dimensions that by virtue of being under a predetermined spring bias of its own it will in addition to the sealing function perform also the function of a compression spring, so that the operating ball of the stick shift lever or generally hand lever, will be pressed into its journaling position within the shift gear bracket or block.

In the preferred embodiment according to the present invention, the sealing means is in the form of a bellows made from rubber or a similar elastic material with a wall thickness which compared to the wall thickness of a normal sealing bellows is relatively thick and in its shape it is preferably tapered in a conical fashion toward the collar of the stick shift lever.

It is noted that the sealing means according to the present invention is equally applicable to motor vehicles having conventional gear shift arrangements or automatic shift arrangements, it is essential only that the shifting is performed by a hand lever arranged next to the driver in the floor area of the vehicle.

BRIEF DESCRIPTION OF THE DRAWINGS

The invention will become more readily apparent from the following description of the preferred embodiments thereof shown in the accompanying drawings, in which.

DESCRIPTION OF THE PREFERRED EMBODIMENTS

Figure 1:
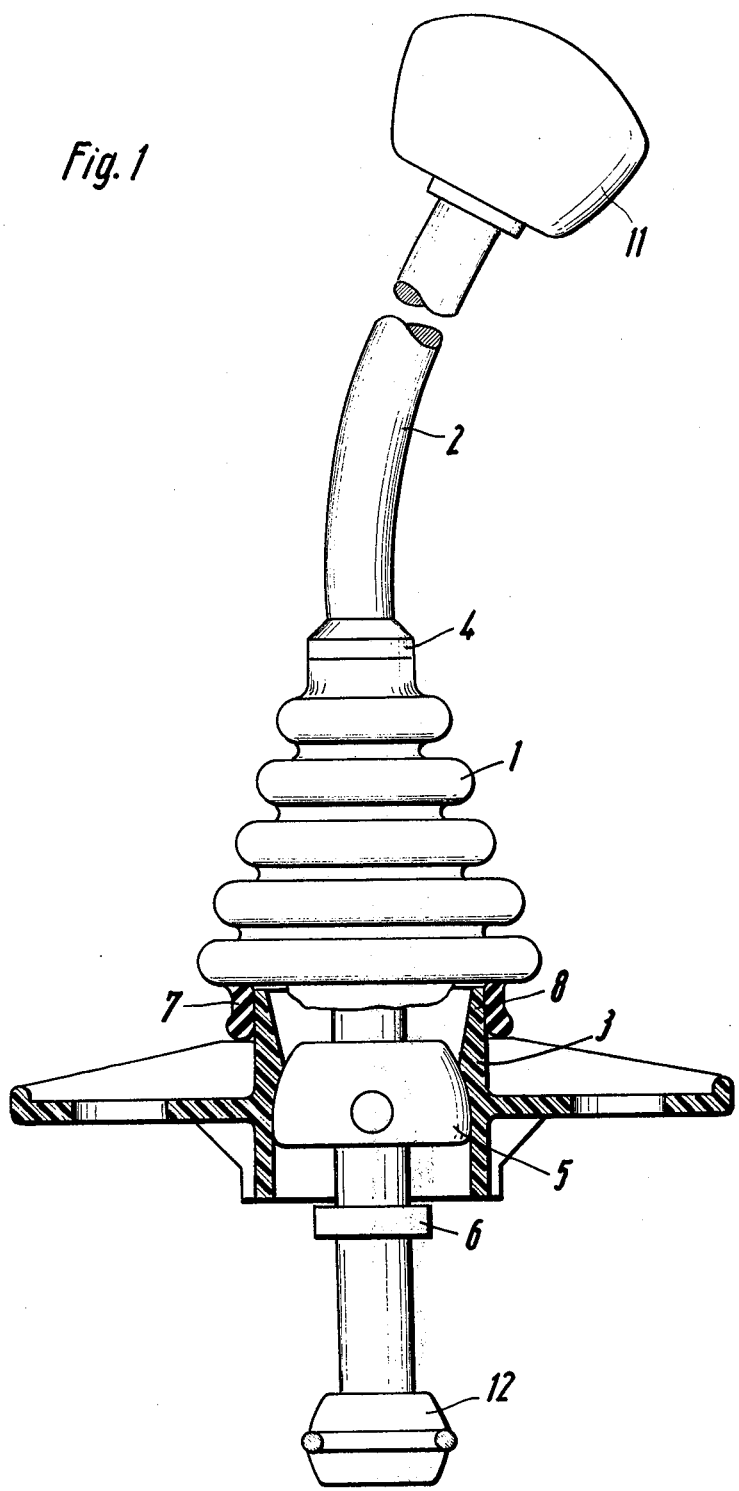
FIG. 1 is an elevational view, partly in section, of a gear shift arrangement including the sealing means according to the present invention.

With reference to FIG. 1, it is seen that a shift lever or shift stick 2 is journalled by means of an operating ball 5 secured thereto in a bracket or block 3 for the shift lever 2. The shift lever 2 is provided with a collar 4 which serves as the upper supporting means for a sealing arrangement 1 which is in the form of a bellows in the present embodiment. The collar 4 is secured to the shift stick 2 in a positive securing manner. The bracket or block 3 is also provided with a collar 8. The neck portion 7 of the hollow cylindrical sealing means 1 is shoved over such collar 8 so that the journaling portion of the stick shift 2 is protected from the entry of dirt. The sealing arrangement 1 during the assembly of the parts is pressed together so that when it is mounted, it will be under a certain bias or compression. Inasmuch as the sealing means 1 is secured between the collar 4 of the stick shift 2 and the collar 8 of the bracket or block 3, the operating ball 5 is pressed into its journaling position within the bracket 3 by means of the compression spring effect on the sealing arrangement 1 in addition to its sealing function and will perform also the function of a compression spring. This spring action is attained due to the fact that the thickness of the bellows of the sealing means 1 made from rubber, when compared to the wall thickness of a normal sealing sleeve, is considerably heavier. Such heavier wall thickness of the sealing arrangement 1 will assure simultaneously a very good dampening of any noises coming from the gear housing. It can be now seen that a spring which is required with the known gear shift arrangements will not be necessary here since the stick shift 2, even then, will be retained in its position due to the spring action of the sealing arrangement 1 when the check ring 6, during the shifting into reverse, becomes pressed under a stop plate not shown in the drawing, by the pressing down of the stick shift 2.

The assembly of the gear shift arrangement according to the present invention is very simple. The stick shift 2 with the operating ball 5 thereon and the check ring 6 and the mounting means 12 which serves for securing to the stick shift as shift rod not shown in the drawing, is shoved into the bracket or block 3 from below. Thereafter, the sealing arrangement 1 is shoved from above over the stick shift 2 until its upper portion sits tightly on the collar 4 and the lower portion is pressed over the collar 8 on the bracket or block 3. During this assembly to the final position, the natural length of the sealing arrangement 1 becomes reduced, so that the sealing arrangement 1 will be under a bias or compression while in the mounted state. The completed gear shift arrangement can thereafter be simply secured to the remaining portion of the vehicle frame by screwing the bracket 3 to the frame. There is no need for any additional securing elements for the stick shift 2 to secure it to the block 3 since, as described above, the stick shift 2 is retained securely with respect to the block 3 solely by means of the sealing arrangement.

Figure 2:
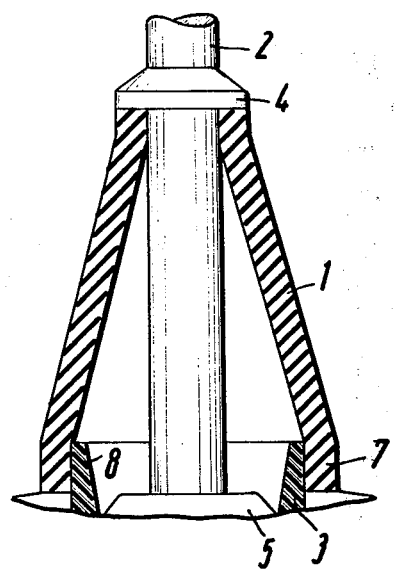
FIGS. 2 and 3 are schematic illustrations in elevational view of two different embodiments of the sealing means according to the present invention.

FIG. 2 illustrates a relatively simple embodiment of the sealing arrangement 1, according to the present arrangement. It is made from a hollow truncated cone from rubber or similar material and having a collar 7 which is shoved over the collar 8 of the block 3. The upper end of the hollow truncated cone of the sealing arrangement 1 is provided also with a hollow cylindrical collar portion in order to provide for a perfect abutting of the sealing arrangement 1 against the collar 4 of the stick shift 2. The wall thickness of such hollow truncated cone, when compared with the wall thickness of a normal sealing sleeve, is relatively heavy. It is recognized that also the sealing arrangement according to FIG. 2 provides as well, a sealing function as a compression spring function. A preliminary bias or compression effect provided by the compression of the sealing arrangement, similarly as described in connection with the embodiment of FIG. 1, will retain the operating ball 5 in its journaling position within the block 3, as described in connection with FIG. 1.

Figure 3:
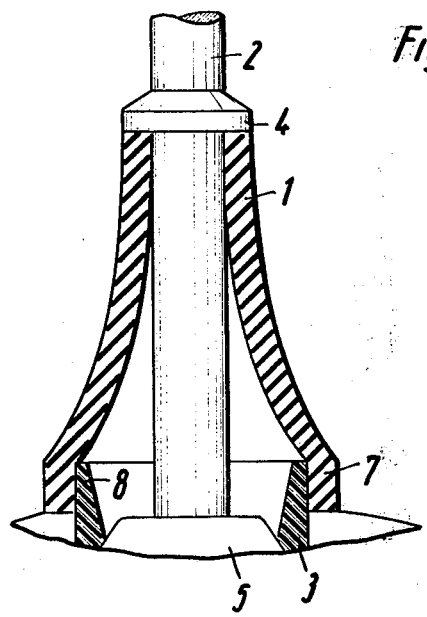

With reference to FIG. 3, illustrating a gear shift sealing arrangement according to the present invention in a different form can be seen in that the sealing arrangement 1 is made from a hollow truncated cone from rubber or similar material, the outer generated surface of which, however, is shaped in a concave fashion. As a result, a somewhat different spring action in its character is attained; however, it performs the same function as the embodiments of the sealing arrangement 1 described in connection with FIGS. 1 and 2.

Figure 4:
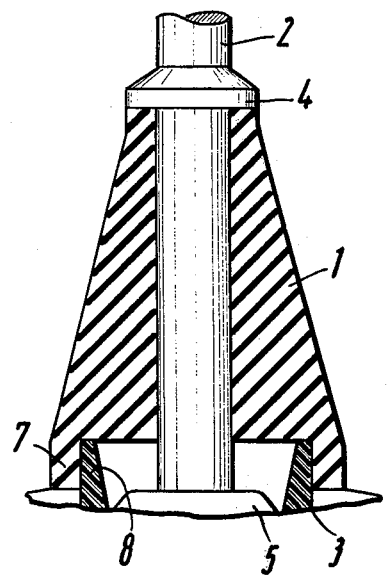
FIG. 4 is similar to the view of FIGS. 2 and 3 illustrating a further embodiment of the sealing means according to the present invention.

The sealing arrangement 1 according to FIG. 4, instead of being a hollow body as the sealing arrangements according to FIGS. 1–3, is a solid body and generally has the shape of a truncated cone and is made from a porous elastic material, such as foam rubber or rubber sponge. Also, this sealing means is relatively simple in structure and provides reliably a sealing function, as well as a spring-like action for the purpose described in connection with the previous embodiments.

The sealing arrangement 1 according to FIG. 4 is provided also with a hollow cylindrical end collar 7 and another collar portion at the other end so that it could be coupled to the collar 8 of the bracket or block 3, as well as to the collar 4 of the stick shift 2.

Figure 5:
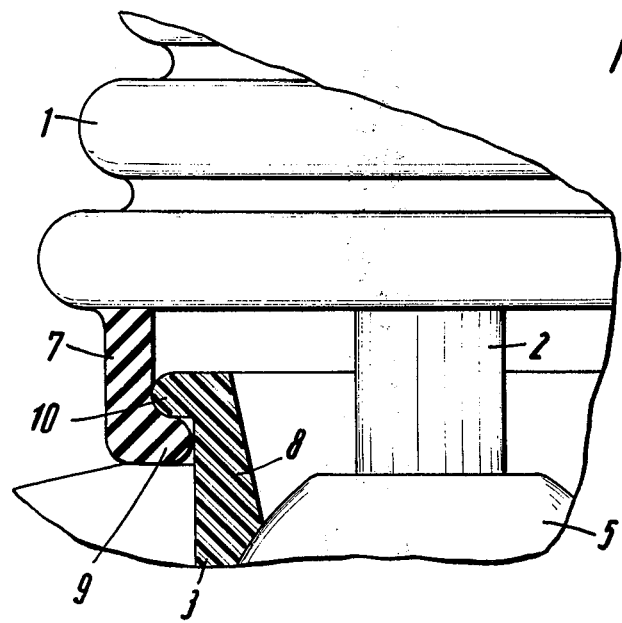
FIG. 5 is a preferred form of a coupling of the sealing means to the collar of the gear shift block according to the present invention.

With further reference to FIG. 1 and now referring to FIG. 5, which illustrates an improved coupling between the collar 7 of the sealing arrangement 1 and the collar 8 of the bracket 3, it is noted that the collar 8, as well as the collar 7, each could be made in the form of a rim band 9 and 10, respectively, which then in the form of oppositely directed hooks or hooked fingers engage each other in a secured fashion.

As illustrated in FIG. 1 and in the subsequent figures, the sealing arrangement which is in the form of a bellows is tapering toward collar 4 of the stick shift 2 in a conical fashion. It is, however, within the scope of the present invention to provide other than a tapering bellows for the sealing arrangement. The conical tapering of the bellows gives the additional advantage that the spring character of the sealing arrangement 1 can be adjusted. For example, the spring character of the sealing arrangement 1 could be further influenced by the selection of the elasticity of the material to be used, by the selection of the thickness of the wall of the bellows, by the number of the bellows, by the magnitude of the radii of the bellows, the pitch of the bellows and its relations to the diameter of the bellows, just to mention a few factors. In the preferred embodiment according to FIG. 1, the bellows has 5 sections made from rubber having a 3 mm thickness which in the natural state has a length of 85 mm and having an upper diameter of about 18 mm and a lower diameter of about 45 mm. and has dimensions I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A gear shift arrangement, comprising
   a shift lever;
   a pivot ball on said shift lever;
   a mounting block having a passage into which said shift lever extends and within which said pivot ball is received, said passage being formed with a seat for said pivot ball;
   a first abutment on said mounting block and a second abutment on said shift lever axially spaced from said first abutment; and
   elastically compressible annular sealing means surrounding a portion of said shift lever in axially compressed condition and having axially spaced ends which respectively bear upon said first and second abutments, so that said sealing means seals said passage in said mounting block and also urges said pivot ball and said seat into engagement with one another.

2. The gear shift arrangement as claimed in claim 1, wherein said end of said sealing means bearing upon said first abutment comprises a hollow cylindrical collar adapted to tightly engage said first abutment.

3. A gear shift arrangement, comprising
   a shift lever;
   a pivot ball on said shift lever;
   a mounting block in which said pivot ball is journalled;
   first collar means on said mounting block and second collar means on said shift lever; and
   a sealing arrangement in form of a hollow truncated body of elastically compressible material and having an outer concave surface, said body being axially compressed and having spaced axial ends which abut said first and second collar means, respectively, so that said body seals said block and presses said pivot ball into the journalling position thereof within said block.

4. A gear shift arrangement, comprising
   a shift lever;
   a pivot ball on said shift lever;
   a mounting body in which said pivot ball is journalled;
   first and second collar means on said block and on said lever, respectively; and
   a sealing arrangement in form of a truncated conical body of porous elastic material and having an aperture therethrough for said lever, said body being axially compressed and having a first collar portion abutting said first collar means and a second collar portion abutting said second collar means, so that said body seals said aperture and presses said pivot ball into the journalling position thereof within said block.

5. The gear shift arrangement as claimed in claim 1, wherein said sealing means comprises bellows means.

6. The gear shift arrangement as claimed in claim 5, wherein said bellows means tapers in a conical fashion towards said second abutment.

7. The gear shift arrangement as claimed in claim 1, wherein said sealing means comprises a hollow truncated conical body.

8. The gear shift arrangement as claimed in claim 2, wherein said first abutment has a rim-shaped annular portion, said hollow cylindrical collar of said sealing means having a rim-shaped annular end portion directed inwardly and cooperating with said annular portion pointed outwardly for tightly engaging each other.

9. The gear shift arrangement as claimed in claim 1, for use with the gear shifting arrangement of a motor vehicle having an automatic or a manual gear shifting arrangement.

* * * * *